(12) United States Patent
Lee

(10) Patent No.: US 10,205,351 B2
(45) Date of Patent: Feb. 12, 2019

(54) WIRELESS POWER TRANSMITTER, WIRELESS POWER REPEATER AND WIRELESS POWER TRANSMISSION METHOD

(75) Inventor: Jung Oh Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 1146 days.

(21) Appl. No.: 14/347,872

(22) PCT Filed: Aug. 13, 2012

(86) PCT No.: PCT/KR2012/006426
§ 371 (c)(1),
(2), (4) Date: May 22, 2014

(87) PCT Pub. No.: WO2013/048004
PCT Pub. Date: Apr. 4, 2013

(65) Prior Publication Data
US 2014/0252875 A1    Sep. 11, 2014

(30) Foreign Application Priority Data
Sep. 27, 2011    (KR) .................. 10-2011-0097769

(51) Int. Cl.
*H01F 27/42* (2006.01)
*H01F 37/00* (2006.01)
(Continued)

(52) U.S. Cl.
CPC .............. *H02J 50/50* (2016.02); *H01F 38/14* (2013.01); *H02J 5/005* (2013.01); *H02J 7/025* (2013.01);
(Continued)

(58) Field of Classification Search
CPC .. H02J 7/025; H02J 50/12; H02J 50/50; H02J 50/70; H01F 38/14; H01F 38/04
See application file for complete search history.

(56) References Cited

U.S. PATENT DOCUMENTS

| | | |
|---|---|---|
| 7,211,986 B1 | 5/2007 | Flowerdew et al. |
| 2005/0127867 A1 | 6/2005 | Calhoon et al. |

(Continued)

FOREIGN PATENT DOCUMENTS

| | | |
|---|---|---|
| JP | 2010-527226 A | 8/2010 |
| JP | 2011-151989 A | 8/2011 |
| WO | WO-2009023646 A2 | 2/2009 |

OTHER PUBLICATIONS

Office Action dated Nov. 4, 2015 in Chinese Application No. 201280058308.0.

(Continued)

*Primary Examiner* — Rexford Barnie
*Assistant Examiner* — Rasem Mourad
(74) *Attorney, Agent, or Firm* — Saliwanchik, Lloyd & Eisenschenk

(57) ABSTRACT

Disclosed is a wireless power transmitter which wirelessly transmits power through a wireless power repeater to a wireless power receiver using resonance. The wireless power transmitter includes a power supply unit for outputting AC power having a predetermined frequency, a transmission coil for receiving the AC power to generate a time-variable magnetic field, and a transmission resonant coil unit for transmitting power received from the transmission coil coupled with the transmission resonant coil, wherein the wireless power transmitter determines a resonance frequency for a power transmission while controlling a frequency of the AC power output from the power supply unit and a resonance frequency of the transmission resonant coil unit.

9 Claims, 3 Drawing Sheets

(51) Int. Cl.
  *H01F 38/00* (2006.01)
  *H02J 50/50* (2016.01)
  *H02J 50/12* (2016.01)
  *H02J 50/90* (2016.01)
  *H02J 50/70* (2016.01)
  *H02J 5/00* (2016.01)
  *H02J 7/02* (2016.01)
  *H01F 38/14* (2006.01)

(52) U.S. Cl.
  CPC .............. *H02J 50/12* (2016.02); *H02J 50/70* (2016.02); *H02J 50/90* (2016.02)

(56) References Cited

U.S. PATENT DOCUMENTS

| | | | |
|---|---|---|---|
| 2009/0058189 A1 | 3/2009 | Cook et al. | |
| 2009/0096413 A1 | 4/2009 | Partovi et al. | |
| 2009/0284369 A1* | 11/2009 | Toncich | G06K 7/0008 340/539.3 |
| 2010/0065352 A1* | 3/2010 | Ichikawa | B60L 11/182 180/65.8 |
| 2010/0201204 A1* | 8/2010 | Sakoda | H02J 5/005 307/104 |
| 2010/0207572 A1* | 8/2010 | Kirby | H02J 7/355 320/101 |
| 2010/0259109 A1 | 10/2010 | Sato | |
| 2011/0133569 A1* | 6/2011 | Cheon | H02J 17/00 307/104 |
| 2011/0181120 A1 | 7/2011 | Liu et al. | |
| 2012/0001485 A1* | 1/2012 | Uchida | H02J 7/025 307/11 |
| 2012/0062173 A1* | 3/2012 | Choi | H02J 5/005 320/108 |

OTHER PUBLICATIONS

International Search Report in International Application No. PCT/KR2012/006426, filed Aug. 13, 2012.
European Search Report dated May 8, 2015 in European Application No. 12836223.3.

\* cited by examiner

[Fig. 1]
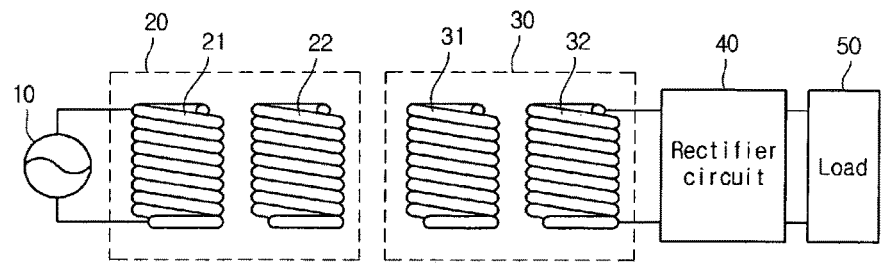
[Fig. 2]
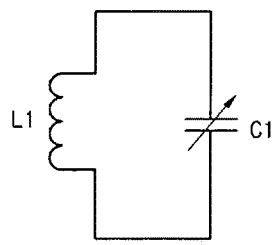
[Fig. 3]
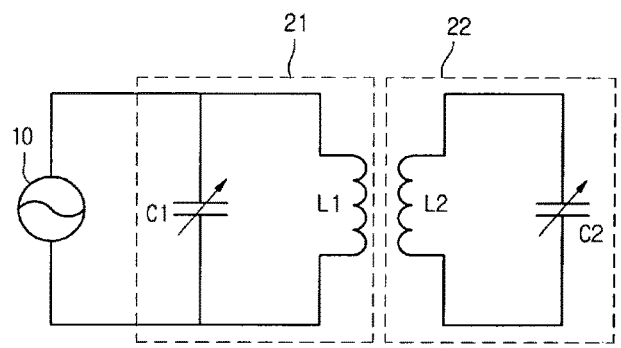
[Fig. 4]
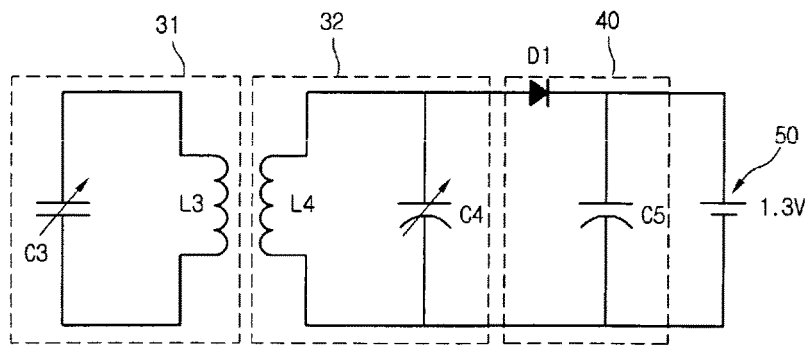

[Fig. 5]
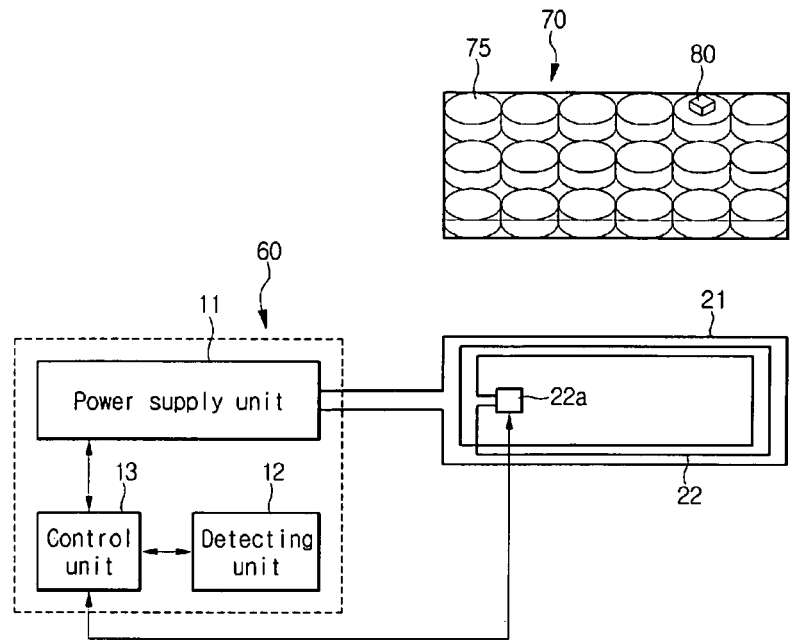
[Fig. 6]
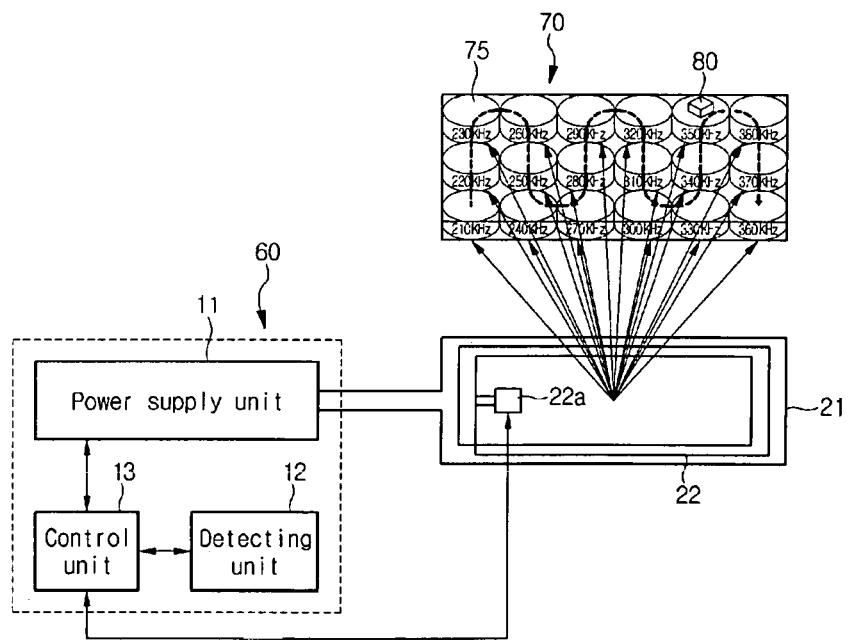

[Fig. 7]
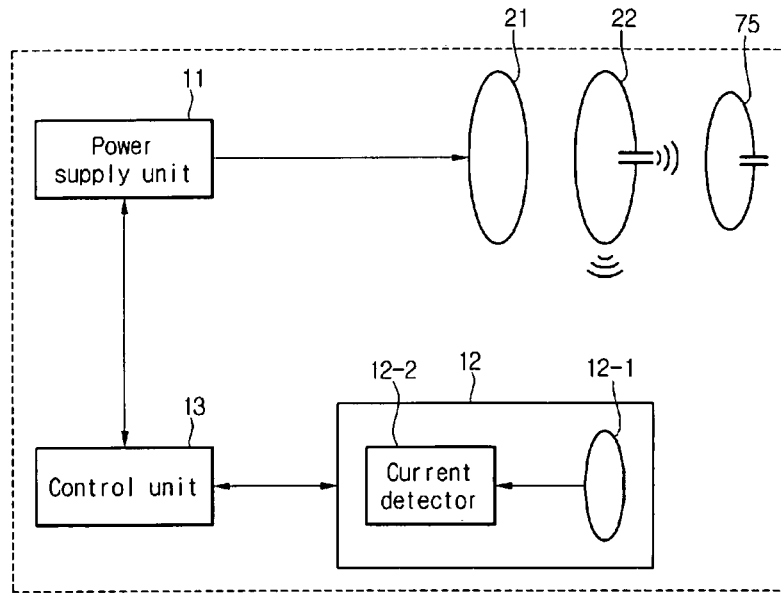
[Fig. 8]
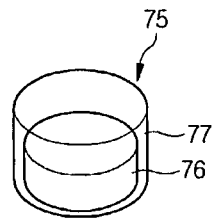
[Fig. 9]
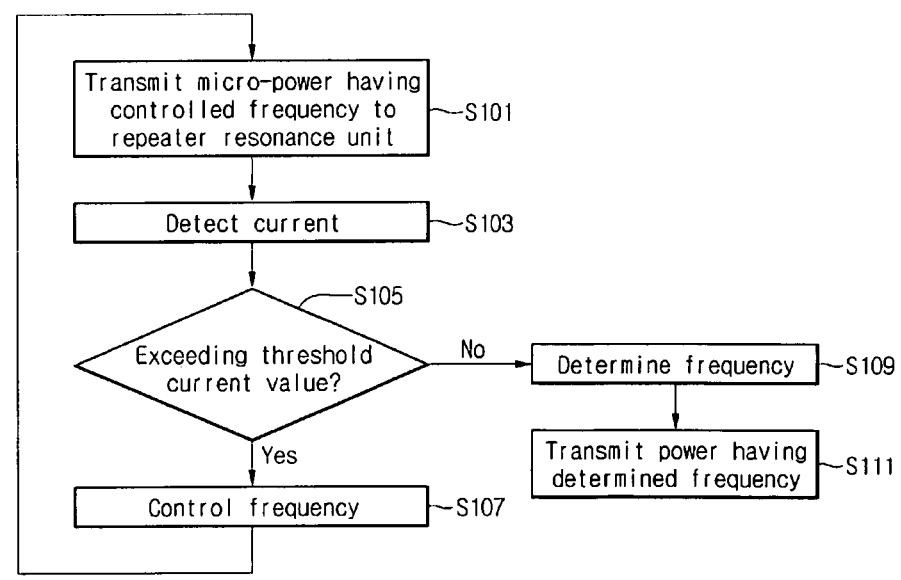

# WIRELESS POWER TRANSMITTER, WIRELESS POWER REPEATER AND WIRELESS POWER TRANSMISSION METHOD

CROSS-REFERENCE TO RELATED APPLICATIONS

This application is the U.S. national stage application of International Patent Application No. PCT/KR2012/006426, filed Aug. 13, 2012, which claims priority to Korean Application No. 10-2011-0097769, filed Sep. 27, 2011, the disclosures of each of which are incorporated herein by reference in their entirety.

TECHNICAL FIELD

The disclosure relates to wireless power transmitting technology. In more particular, the disclosure relates to a wireless power transmitter capable of effectively transmitting energy using resonance, a wireless power repeater and a wireless power transmission method.

BACKGROUND ART

A wireless power transmission or a wireless energy transfer refers to a technology of wirelessly transferring electric energy to desired devices. In the 1800's, an electric motor or a transformer employing the principle of electromagnetic induction has been extensively used and then a method for transmitting electrical energy by irradiating electromagnetic waves, such as radio waves or lasers, has been suggested. Actually, electrical toothbrushes or electrical razors, which are frequently used in daily life, are charged based on the principle of electromagnetic induction. Until now, the long-distance transmission using the magnetic induction, the resonance and the short-wavelength radio frequency has been used as the wireless energy transfer scheme.

In the case of a short-distance wireless power transmission, which has been spotlighted in these days, a wireless power transmitter is installed in a building in such a manner that a mobile device, such as a cellular phone or a notebook computer, can be continuously charged when a user uses the mobile device in the building even if the mobile device is not connected to an additional power cable.

In the above wireless power transmission technologies, a coupling coefficient between a wireless power transmitter and a wireless power receiver must be equal to or higher than the critical value in order to effectively perform the wireless power transmission using resonance. At this time, the coupling coefficient may be determined depending on the size of a transmission resonant coil of the transmitter and a receiving resonant coil of the receiver and the distance between the transmitter and the receiver.

In general, the size of the receiving resonant coil is significantly smaller than the size of the transmission resonant coil, so the coupling coefficient between the transmission resonant coil and the receiving resonant coil is very small. Accordingly, energy transmission efficiency may be reduced due to the resonance between the transmission apparatus and the receiving apparatus. Therefore, a repeater resonant unit is installed between the wireless power transmitter and the wireless power receiver to relay the wireless power through the repeater resonant unit.

However, according to the wireless power transmission of the related art, power must be constantly transmitted or relayed regardless of the existence and location of the wireless power receiver that receives the power, causing the waste of the power and damage to the human body

DISCLOSURE OF INVENTION

Technical Problem

The disclosure provides a wireless power transmitter capable of transmitting energy using resonance, a wireless power repeater and a wireless power transmission method.

In addition, the disclosure provides a wireless power transmitter capable of transmitting energy through a specific repeater resonator corresponding to a location of a wireless power receiver, a wireless power repeater and a wireless power transmission method.

Further, the disclosure provides a wireless power transmitter capable of detecting a location of a wireless power receiver by transmitting micro-power while sequentially varying frequencies, a wireless power repeater and a wireless power transmission method.

Further, the disclosure provides a repeater resonant unit including a plurality of repeater resonators which have self-resonance frequencies different from each other and are regularly arranged.

Further, the disclosure provides a repeater resonant unit capable of preventing a magnetic field from leaking to an external.

Solution to Problem

According to the embodiment, there is provided a wireless power transmitter to wirelessly transmit power through a wireless power repeater to a wireless power receiver. The wireless power transmitter includes a power supply unit for outputting AC power having a predetermined frequency; a transmission coil for receiving the AC power to generate a time-variable magnetic field; and a transmission resonant coil unit for transmitting power received from the transmission coil coupled with the transmission resonant coil, wherein the wireless power transmitter determines a resonance frequency for a power transmission while controlling a frequency of the AC power output from the power supply unit and a resonance frequency of the transmission resonant coil unit.

According to the embodiment, there is provided a wireless power repeater for relaying a power transmission between a wireless power transmitter and a wireless power receiver. The wireless power repeater includes a plurality of repeater resonant coils having resonance frequencies different from each other, wherein the wireless power repeater relays the power transmission through one of the repeater resonant coils corresponding to a resonance frequency of the wireless power transmitter and the wireless power receiver.

According to the embodiment, there is provided a wireless power transmission method of a wireless power transmitter to wirelessly transmit power through a wireless power repeater to a wireless power receiver using resonance. The wireless power transmission method includes transmitting micro-power having frequencies with a predetermined frequency interval to the wireless power repeater at a predetermined time period; detecting an internal current value of the wireless power transmitter according to the transmitted micro-power; and determining a resonance frequency for a power transmission based on the detected current value.

Advantageous Effects of Invention

According to the embodiment, the wireless power transmitter transmits energy through a repeater resonator corresponding to a location of a wireless power receiver, so that energy transmission efficiency to a wireless power receiver may be improved.

Further, the wireless power transmitter concentrates energy transmission to a specific repeater resonator, so that the waste of the power may be reduced and generation of a magnetic field harmful to the human body may be reduced.

Further, a shielding unit is formed to surround a repeater resonant coil unit, so a magnetic field may be prevented from leaking to an external.

Meanwhile, other various effects may be directly or indirectly disclosed in the following description of the embodiment of the disclosure.

BRIEF DESCRIPTION OF DRAWINGS

FIG. 1 is a view illustrating a wireless power transmission system according to one embodiment;

FIG. 2 is a circuit diagram showing an equivalent circuit of a transmission coil unit according to one embodiment;

FIG. 3 is a circuit diagram showing an equivalent circuit of a power source and a transmitting unit according to one embodiment;

FIG. 4 is a circuit diagram showing an equivalent circuit of a reception resonant coil, a reception coil unit, a smoothing circuit, and a load according to one embodiment;

FIG. 5 is a view showing a wireless power transmission system according to another embodiment;

FIG. 6 is a view illustrating a method of wirelessly transmitting power through a specific repeater resonator in the wireless power transmission system of FIG. 5; and FIG. 7 is a view showing a detecting unit according to another embodiment.

FIG. 8 shows a repeat resonator including a repeater coil unit and a shielding unit.

FIG. 9 is a flowchart illustrating the wireless power transmission method of a wireless power apparatus according to an embodiment.

BEST MODE FOR CARRYING OUT THE INVENTION

If detailed description about well-known functions or configurations may make the subject matter of the disclosure unclear, the detailed description will be omitted. Accordingly, hereinafter, description will be made regarding only essential components directly related to the technical scope of the disclosure. In addition, terminologies to be described are defined based on functions of components according to the embodiment, and may have meanings varying according to the intentions of a user or an operator and customers. Accordingly, the terminologies should be defined based on the whole context throughout the present specification.

Hereinafter, the embodiment will be described with reference to accompanying drawings.

FIG. 1 is a view showing a wireless power transmitting system according to the embodiment.

Referring to FIG. 1, the wireless power transmitting system includes a power source 10, a power transmitting unit 20, a power receiving unit 30, a current-rectifier circuit 40 and a load 50.

The power generated from the power source 10 is provided to the power transmitting unit 20, such that the power transmitting unit 20 transmits the power using resonance to the power receiving unit 30, which is resonant with the power transmitting unit 20 and has the same resonance frequency value as that of the power transmitting unit 20.

The power transferred to the power receiving unit 30 is transferred via the rectifier circuit 40 to the load 50. The load 50 may be a battery or a predetermined apparatus which needs power.

In detail, the power source 10 is an AC power source for supplying AC power of a predetermined frequency.

The power transmitting unit 20 includes a transmission coil unit 21 and a transmission resonant coil unit 22. The transmission coil unit 21 is connected to the power source 10, such that an AC current flows through the transmission coil unit 21. When an AC current flows through the transmission coil unit 21, an AC current is induced to the transmission resonant coil unit 22 physically apart from the transmission coil unit 21 due to electromagnetic induction. The power transferred to the transmission resonant coil unit 22 is transmitted using resonance to the power receiving unit 30 which forms a resonance circuit with the power transmitting unit 20.

According to the power transmission using resonance, the power can be transmitted between two LC circuits which are impedance-matched. The power transmission scheme using the resonance can transmit the power farther than the power transmission scheme using the electromagnetic induction with the higher power transmission efficiency.

The power receiving unit 30 includes a reception resonant coil unit 31 and a reception coil unit 32. The power transmitted from the transmission resonant coil unit 22 is received at the reception resonant coil unit 31, such that the AC current flows through the reception resonant coil unit 31. The power transmitted to the reception resonant coil unit 31 is transferred by electromagnetic induce to the reception coil unit 32. The power transferred to the reception coil 32 is transferred through the rectifier circuit 40 to the load 50.

FIG. 2 is an equivalent circuit diagram of the transmission coil unit 21 according to the embodiment. As shown in FIG. 2, the transmission coil unit 21 may include an inductor L1 and a capacitor C1, and form a circuit having a suitable inductance value and a suitable capacitance value.

The capacitor C1 may be a fixed capacitor or a variable capacitor. When the capacitor C1 is the variable capacitor, the power transmitting unit 20 may control the variable capacitor, such that the power transmitting unit 20 may perform an impedance matching. Meanwhile, equivalent circuits of the transmission resonant coil unit 22, the reception resonant coil unit 31, and the reception coil unit 32 may be equal to that depicted in FIG. 2.

FIG. 3 is an equivalent circuit diagram of the power source 10 and the power transmitting unit 20 according to the embodiment. As shown in FIG. 3, each of the transmission coil unit 21 and the transmission resonance coil part 22 may include an inductor L1 or L2 and a capacitor C1 or C2.

The capacitor C2 of the transmission resonant coil unit 22 may be a variable capacitor, and the power transmitting unit 20 may control the variable capacitor to control a resonance frequency value for resonance.

FIG. 4 is an equivalent circuit diagram of the reception resonant coil unit 31, the reception coil unit 32, a rectifier circuit 40 and the load 50 according to the embodiment. As shown in FIG. 4, each of the transmission resonant coil unit 31 and the reception coil part 32 may include an inductor L3 or L4 and a capacitor C3 or C4 having a predetermined inductance value and a predetermined capacitance value.

The rectifier circuit 40 may include a diode D1 and a rectifying capacitor C5 such that the rectifier circuit 40 converts AC power into DC power and outputs the DC power. Although the load 50 is denoted as a 1.3 V DC power source, the load 50 may be a battery or other devices requiring DC power.

Hereinafter, a method for transmitting energy through a specific repeater resonator corresponding to the location of the wireless power receiver according to the embodiment will be described.

FIG. 5 is a view showing a configuration of the wireless power transmission system according to another embodiment.

Referring to FIG. 5, the wireless power transmission system includes a wireless power transmitter 60, a repeater resonant unit 70 and a wireless power receiver 80. The present embodiment will be described on the assumption that the wireless power transmitter 60 transmits energy through the repeater resonator 70 to the wireless power receiver 80.

The wireless power transmitter 60 includes a power supply unit, a detecting unit 12, a control unit 13, a transmission coil unit 21 and a transmission resonant coil unit 22. In FIG. 5, all elements except for the transmission coil unit 21 and the transmission resonant coil unit 22 may be included in the power source 10 depicted in FIG. 1.

The wireless power transmitter 60 may transmit energy directly or through the repeater resonant unit to the wireless power receiver 80. Since it is assumed in the present embodiment that a coupling coefficient between the transmission resonant coil unit and the reception resonant coil unit has a relatively small value, the following description will be made on the assumption that the wireless power transmitter 60 transmits energy through the repeater resonant unit 70 to the wireless power receiver 80 without directly transmitting the energy to the wireless power receiver 80.

The power supply unit 11 may generate AC power having a specific frequency for a wireless power transmission using resonance.

The power supply unit 11 may include an oscillator for generating an AC signal having a specific frequency. In the embodiment, the oscillator may be separated from the power supply unit 11. The power supply unit 11 may generate AC power using the AC signal having the specific frequency generated from the oscillator.

The power supply unit 11 outputs micro-power for detecting a position of the wireless power receiver 80 disposed on the repeater resonant unit 70 under control of the controller 13.

The control unit 13 may determine a resonance frequency for a power transmission by controlling the frequency of AC power output from the power supply unit 11 and the resonance frequency of the transmission resonant coil unit 22.

When the micro-power for detecting the position of the wireless power receiver 80 is provided, the detecting unit 12 detects an internal current variation of the wireless power transmitter 60 and provides information about the internal current variation of the wireless power transmitter 60 to the control unit 13. Then, the control unit 13 may determine a frequency for normal transmission of power greater than the micro-power based on the information about the current variation.

The transmission coil unit 21 is connected to the power supply unit 11 such that AC current may flow therethrough. When the AC current flows through the transmission coil unit 21, an AC current is induced by electromagnetic induction to the transmission resonant coil unit 22 physically apart from the transmission coil unit 21. The power transmitted to the transmission resonant coil unit 22 is transferred using resonance to the repeater resonant unit 70 which forms a resonance circuit with the wireless power transmitter 60.

The transmission resonant coil unit 22 includes a capacitor 22a which is a fixed capacitor or a variable capacitor.

If the capacitor 22a of the transmission resonant coil unit 22 is a variable capacitor, the wireless power transmitter 60 may control a self-resonance frequency for resonance through the capacitor 22a of the transmission resonant coil unit 22. The control unit 13 may control the capacitance of the capacitor 22a of the resonant coil unit 22 such that the control unit 13 may control the resonance frequency of the wireless power transmitter 60.

The repeater resonant unit 70 performs a function of relaying the energy transmitted by resonance from the transmission resonant coil unit 22.

Preferably, the repeater resonator 75 in the repeater resonant unit 70 is larger than the reception resonance coil in the wireless power receiver 80. The reason is because a coupling coefficient, which is equal to a threshold value or above, must exist between resonance coils of a transmitting party and a receiving party. According to one embodiment, the repeater resonator 75 is larger than the reception resonance coil of the wireless power receiver 80, so a radius of the repeater coil unit 76 of a repeater resonator described below may be greater than a radius of the reception resonant coil unit.

Thus, the transmission efficiency of the energy transmission scheme using the plurality of repeater resonators 75 is improved as compared with a scheme of directly transmitting energy from the wireless power transmitter 60 to the wireless power receiver 80.

The repeater resonant unit 70 may include the plurality of repeater resonators 75 regularly arranged. In the embodiment, all repeater resonators 75 may have the same size and shape. For example, as shown in FIG. 5, the repeater resonators 75 have a cylindrical shape, respectively, but the embodiment is not limited thereto. According to another embodiment, the repeater resonators 75 may have various shapes such as a hexahedron, a rectangular pillar, etc.

Although the repeater resonant unit 70 includes eighteen repeater resonators 75 arranged in a lattice form or a matrix form in the embodiment, the embodiment is not limited thereto and the repeater resonators 75 may be arranged in various forms. In addition, although the repeater resonant unit 70 is provided in the form of a repeater pad in the embodiment, the embodiment is not limited thereto.

Each of the repeat resonators 75 may include a repeater coil unit 76 and a shielding unit 77. For example, as shown in FIG. 8, the shielding unit 77 may surround an outer side of the repeater resonant coil unit 76 and may be formed such that an upper side of the shielding unit 77 may be located at a position higher than that of an upper side of the repeater resonance coil. The shielding unit 77 guides a transmitting direction of magnetic field and prevents the magnetic field from leaking to an external. In addition, the shielding unit 77 may be conventionally formed of a ferrite sheet.

Each of the repeat resonators 75 may include a capacitor (not shown), which may be a fixed capacitor or a variable capacitor. The repeater resonators 75 may sequentially have self-resonance frequencies with a predetermined frequency interval.

For example, as shown in FIG. 6, the repeater resonators 75 may have resonance frequencies with a predetermined frequency interval of 10 KHz in the full frequency range of 210 KHz to 380 KHz. By this configuration of the repeater resonant unit 70, the wireless power transmitter 60 can transmit power through a specific repeater resonator to the wireless power receiver 80.

That is, if the wireless power receiver 80 is placed on the repeater resonant unit 70, the wireless power transmitter 60 transmits energy through a specific repeater resonator corresponding to the position of the wireless power receiver 80. In detail, the wireless power transmitter 60 transmits power having the frequency the same as the resonance frequency of the specific repeater resonator, such that the wireless power transmitter 60 may transmit power to the wireless power receiver 80 provided on the specific repeater resonator.

Although not depicted in FIG. 5, the wireless power receiver 80 may include a reception resonant coil unit, a reception coil unit and a control unit, and may further include a smoothing circuit and a load.

The power transmitted by the wireless power receiver 80 is received at the reception resonant coil unit such that an AC current flows through the reception resonant coil unit. The power transmitted to the reception resonant coil unit is transmitted by electromagnetic induction to the reception coil unit. The power transmitted to the reception coil unit is rectified by the rectifier circuit and transferred to the load.

The reception resonant coil unit may include a variable capacitor, and the control unit of the wireless power receiver 80 may control the variable capacitor such that the self-resonance frequency of the wireless power receiver 80 may vary.

While the control unit changes the self-resonance frequency with a predetermined frequency interval at a predetermined time period, the control unit detects an internal current variation of the wireless power receiver 80. In the embodiment, the control unit may control such that the self-resonance frequency varies at the same time point as the frequency changing time point of the wireless power transmitter 60. For example, as shown in FIG. 6, the control unit may control such that the self-resonance frequency may be varied in the unit of 10 KHz in the frequency range of 210 KHz to 380 KHz.

The detecting unit detects the internal current variation of the wireless power receiver 80 according to a control of the control unit and provides information about the current variation to the control unit. Then, the control unit determines frequencies of wireless powers to be received and to be transmitted. That is, the control unit may recognize that the wireless power receiver 80 is placed on the repeater resonator having the determined frequency as the resonance frequency.

The control unit may control through the variable capacitor such that the self-resonance frequency of the wireless power receiver 80 is adjusted to a frequency through which the power is received from the wireless power transmitter 60. The wireless power receiver 80 receives the power having the adjusted frequency through a specific repeater resonator.

FIG. 6 is a view illustrating a method for transmitting wireless power through a specific repeater resonator in the wireless power transmission system in FIG. 5.

Referring to FIG. 6, while the wireless power transmitter 60 changes the frequency in a predetermined frequency interval at a predetermined time period in order to detect a position of the wireless power receiver 80, the wireless power transmitter 60 transmits micro-power. For example, as shown in FIG. 6, the wireless power transmitter 60 transmits the micro-power while changing the frequency in the unit of 10 KHz in the frequency range of 210 KHz to 380 KHz.

At the same time, the wireless power transmitter 60 detects the internal current variation of the wireless power transmitter 60 and determines the position of the wireless power receiver 80. That is, the wireless power transmitter 60 determines the existence of the wireless power receiver 80 provided on a repeater resonator having a predetermined resonance frequency.

The repeater resonant unit 70 receives the micro-power transmitted from the wireless power transmitter 60. At this time, the repeater resonant unit 70 includes a plurality of repeater resonators 75 having self-resonance frequencies apart from each other by a predetermined bandwidth. For example, as shown in FIG. 6, it is assumed that the repeater resonators 75 have resonance frequencies different from each other and spaced apart from each other in the unit of 10 KHz in the frequency range of 210 KHz to 380 KHz.

The wireless power receiver 80 detects the current variation while changing a frequency at the time period the same as that of the wireless power transmitter 60, and determines the frequency at which the wireless power is received or to be received based on information about the detected current variation. For example, as shown in FIG. 6, it is assumed that the wireless power receiver 80 exists on the repeater resonator having 350 KHz and changes the resonance frequency in the unit of 10 KHz in the frequency range of 210 KHz to 380 KHz.

First, the wireless power transmitter 60 transmits the micro-power while changing the frequency of the micro-power in the unit of 10 KHz in the frequency range of 210 KHz to 380 KHz. At the same time, the wireless power receiver 80 changes the self-resonance frequency in the unit of 10 KHz in the frequency range of 210 KHz to 380 KHz.

When the wireless power transmitter 60 sequentially transmits the micro-power having frequencies other than 350 KHz, a current above the threshold value may be detected in the wireless power transmitter 60, which signifies that the wireless power receiver 80 does not exist on the repeater resonator having the corresponding frequency.

In the embodiment, the threshold current value of the wireless power transmitter 60 is a minimum current value at which the wireless power receiver 80 is not detected. According to the embodiment, when the wireless power transmission is not performed since the resonance frequencies among the wireless power transmitter 60, the repeater resonator 75 and the wireless power receiver 80 are different from each other, an amount of energy stored in the transmission resonance coil 22 of the wireless power transmitter 60 is decreased, so that the amount of current detected in the wireless power transmitter 60 may be increased. The control unit 13 receives information about a variation of the amount of current from the detecting unit 12. When the current is detected above the threshold value, the control unit 13 may identify that the wireless power receiver 80 does not exist on the area in which the 350 KHz repeater resonator 75 is located.

To the contrary, when the wireless power transmitter 60 transmits 350 KHz micro-power, a current below the threshold value may be detected in the wireless power transmitter 60 and it may be determined that the wireless power receiver 80 exists on the repeater resonator having the corresponding frequency. At this time, the wireless power receiver 80 has the self-resonance frequency of 350 KHz by controlling the variable capacitor. Thus, the wireless power transmission may be fulfilled using resonance among the wireless power transmitter 60, the repeater resonator 75 and the wireless power receiver 80.

If the wireless power transmission is fulfilled, the amount of energy stored in the transmission resonance coil 22 of the wireless power transmitter 60 is decreased, so that the amount of current detected in the wireless power transmitter 60 is reduced. When the control unit 13 receives information about the variation of the amount of current and a current below the threshold value is detected, the control unit 13 may recognize that the wireless power receiver 80 exists on the area in which the 350 KHz repeater resonator 75 is located.

Hereinafter, the method for detecting a location of the wireless power receiver 80 by the wireless power transmitter 60 according to the embodiment will be described with reference to FIG. 7.

FIG. 7 is a view showing a configuration of the detecting unit according to another embodiment.

Referring to FIG. 7, the detecting unit 12 includes a detecting coil 12_1 and a current detector 12_2.

The detecting coil 12_1 may detect intensity of a magnetic field transmitted from the transmission resonant coil unit 22 or a resonant coil unit of a specific repeater resonator 75. Meanwhile, as an example, the embodiment shows that the detecting coil 12_1 may detect the intensity of the magnetic field generated from the transmission resonant coil unit 22.

The current detector 12_2 converts the power generated by the magnetic field detected through the detecting coil 12_1 into an electric current and detects a variation of an amount of current based on the converted electric current. In addition, the current detector 12_2 provides information about the variation of the amount of current to the control unit 13.

The principle of detecting a location of the wireless power receiver through a variation of current amount by the control unit 13 is as follows.

In FIG. 7, the transmission resonant coil unit 22 and the resonant coil unit (hereinafter, referred to as 'repeater resonant coil unit') of the repeater resonator 75 perform a function of storing power using resonance. An amount of energy stored in the transmission resonant coil unit 22 and the repeater resonant coil unit 75 is obtained from Input power×Q (Q=Quality Factor). The Q value of the transmission resonant coil unit 22 and the repeater resonant coil unit 75 may become lowered as the power received in a receiver is increased due to the approach of the receiver to the a transmitter or a specific repeater resonator.

In addition, since the magnetic force generated from the transmission resonant coil unit 22 and the repeater resonant coil unit 75 is proportional to the energy stored therein, the amount of energy stored in the transmission resonant coil unit 22 and the repeater resonant coil unit 75 is reduced as the receiver approaches the transmitter or the specific repeater resonator. Thus, the intensity of the magnetic field generated by the transmission resonant coil unit 22 and the repeater resonant coil unit 75 is weakened and the amount of power detected through the detecting coil 12_1 is reduced.

That is, as the receiver approaches the transmitter or the specific repeater resonator, the current value detected by the current detector 12_2 is reduced. Based on the variation of the amount of current, the control unit 13 may detect the location of the wireless power receiver existing on the repeater resonant unit 70.

Meanwhile, the current detector 12_2 may previously store a reference current value used for detecting whether the wireless power receiver exists. When the wireless power receiver does not exist on the specific repeater resonator, the reference current value may be set based on a value of current flowing through the wireless power transmitter.

The current detector 12_2 detects the variation of the amount of current of the wireless power transmitter by using the current value detected through the detecting coil 12_1 and the reference current value. The current detector 12_2 provides the information about the variation of the amount of current to the control unit 13.

While the control unit 13 transmits micro-power having a progressively varied frequency, the control unit 13 monitors the information about the variation of the amount of current provided from the detecting unit 12. The control unit 13 recognizes whether the wireless power receiver exists on the 350 KHz repeater resonator based on the information about the variation of the amount of current.

When the location of the wireless power receiver 80 is detected, the wireless power transmitter 60 transmits power having the frequency of 350 KHz.

Referring again to FIG. 6, the wireless power receiver 80 detects a current variation therein while changing the self-resonance frequency with a predetermined frequency interval at a predetermined time period. The wireless power receiver 80 sequentially changes the self-resonance frequency at the same frequency changing time points as those of the wireless power transmitter 60.

When the wireless power receiver 80 is placed on the 350 KHz repeater resonator, the wireless power transmission is performed using resonance between the wireless power transmitter, the repeater resonator and wireless power receiver. At this time, the wireless power transmitter 60 is in a state of transmitting the 350 KHz micro-power and the wireless power receiver 80 has the self-resonance frequency of 350 KHz through the control of the variable capacitor.

If the wireless power transmission occurs, the amount of energy stored in the reception resonance coil of the wireless power receiver 80 is increased, so that the amount of current detected in the wireless power receiver is increased. When the control unit in the reception apparatus receives the information about the variation of the amount of current from the detecting unit of the reception apparatus, the control unit recognizes that the wireless power receiver exists on the area in which the 350 KHz repeater resonator is located.

The wireless power receiver 80 fixes the self-resonance frequency to 350 KHz by controlling the variable capacitor. The wireless power receiver 80 receives the power transmitted from the wireless power transmitter 60 through the 350 KHz repeater resonator.

FIG. 9 is a flowchart illustrating the wireless power transmission method of a wireless power apparatus according to the embodiment.

Hereinafter, the wireless power transmission method of a wireless power apparatus will be described with reference to FIGS. 5 to 7.

Referring to FIG. 9, in step S101, the wireless power transmitter 60 transmits the micro-power having the controlled frequency to the repeater resonant unit 70. In the embodiment, the wireless power transmitter 60 may sequentially transmit the micro-power having the controlled frequency to each repeater resonator 75 included in the repeater resonant unit 70 for the predetermined time. The wireless power receiver 80 may be set to be operated in the controlled frequency for the predetermined time.

That is, the wireless power receiver 80 may maintain the resonance frequency based on the controlled frequency while the micro-power having the controlled frequency is being sequentially transmitted to each repeater resonator 75 of the repeater resonant unit 70 by the wireless power transmitter 60.

Then, in step S103, the wireless power transmitter 60 detects an internal current in the wireless power transmitter 60. In the embodiment, the internal current of the wireless power transmitter 60 may be detected based on the intensity of the magnetic field generated from the transmission resonant coil unit 22, which has been described with reference to FIG. 7.

In step S107, the wireless power transmitter 60 identifies whether the detected current value is greater than the reference current value.

When the wireless power transmitter 60 identifies that the detected current value is greater than the reference current value, after controlling the frequency again in step S107, the wireless power transmitter 60 returns to the step S101. The detected current value may exceed the reference current value when the resonance frequencies between the wireless power transmitter 80 and the repeater resonator 75 at which the wireless power receiver 80 is located do not correspond to each other.

When the resonance frequencies between the wireless power transmitter 80 and the repeater resonator 75 at which the wireless power receiver 80 is located do not correspond to each other, the wireless power transmitter 60 does not transmit the power more than the micro-power to the repeater resonator 75. Thus, great energy is stored in the transmission resonant coil unit 22, so that the current value detected in the wireless power transmitter 60 may exceed the reference current value.

Meanwhile, when it is identified that the detected current value does not exceed the reference current value, the wireless power transmitter 60 determines the controlled frequency as a frequency at which the micro-power or more is able to be transmitted in step S109. The detected current value may not exceed the reference current value when the resonance frequencies between the wireless power transmitter 80 and the repeater resonator 75 at which the wireless power receiver 80 is located correspond to each other.

The wireless power transmitter 60 may transmit the power through the wireless power repeater 70 which includes the repeater resonators having resonance frequencies set to be different from each other, and may determine the resonance frequency used for transmitting power based on the resonance frequency of the wireless power receiver 80 and the resonance frequency of the repeater resonator 75 matched with the resonance frequency of the wireless power receiver 80.

If the resonance frequencies of the wireless power receiver 80 and the repeater resonator 75 at which the wireless power receiver 80 is located correspond to each other, the wireless power transmitter 80 transmits the micro-power or more to the repeater resonator 75. For this reason, the amount of energy stored in the transmission resonant coil unit 22 becomes reduced, so that the current value detected in the wireless power transmitter 60 may not exceed the reference current value.

Then, in step S111, the wireless power transmitter 60 fixes the self-resonance frequency to the determined frequency and transmits the power through the determined frequency.

The repeater resonant unit 70 corresponding to the determined resonance frequency may transmit the power to the wireless power receiver 80.

As described above, the wireless power transmitter according to the embodiment may transmit energy through the specific repeater resonator corresponding to a location of the wireless power receiver and existing on the repeater resonant unit, so that the efficiency of energy transmission to the wireless power receiver can be improved.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A wireless power transmitter comprising:
    a power supply unit for outputting AC power;
    a transmission coil for receiving the AC power to generate a time-variable magnetic field using the AC power;
    a transmission resonant coil unit for transmitting power received from the transmission coil coupled with the transmission resonant coil;
    a repeater resonant unit for transmitting power received from the transmission resonant coil coupled with the repeater resonant unit, wherein the repeater resonant unit includes a plurality of repeater resonant coils having different resonance frequencies from each other; and
    a control unit configured to:
        change a power level of the AC power to a micro power level;
        change a frequency of the AC power to the each different resonance frequency sequentially in a predetermined period;
        compare an internal current value with a threshold value for the each different resonance frequency;
        determine a first resonance frequency at which the internal current value is not higher than the threshold value, wherein the first resonance frequency corresponds to one of resonance frequencies of the plurality of repeater resonant coils;
        change the power level of the AC power to a power higher than the micro power level; and
        change a frequency of the AC power to the first resonance frequency.

2. The wireless power transmitter of claim 1, wherein the wireless power transmitter transmits power wirelessly to the wireless power receiver using the AC power having the frequency corresponding to the resonance frequency of the first repeater resonant coil.

3. The wireless power transmitter of claim 1, further comprising a detecting unit configured to detect the internal current value of the wireless power transmitter, wherein the detecting unit includes a detecting coil and a current detector.

4. The wireless power transmitter of claim 3,
    wherein the detecting coil detects intensity of a magnetic field transmitted from the transmission resonant coil unit,
    wherein the current detector converts a power generated by a magnetic field detected through the detecting coil into an electric current and detects a variation of an amount of current based on a converted electric current.

5. The wireless power transmitter of claim 1, wherein each of the repeater resonant coils includes a shielding unit, and wherein the shielding unit surrounds an outer side of the repeater resonant coil and is disposed such that an upper side of the shielding unit is located at a position higher than an upper side of the repeater resonant coil.

6. A wireless power transmission method, comprising:
providing a wireless power transmitter and a wireless power repeater including a plurality of repeater resonant coils, wherein the plurality of repeater resonant coils have different resonance frequencies from each other;
outputting AC power;
changing a power level of the AC power to a micro power level;
changing a frequency of the AC power to each resonance frequency sequentially in a predetermined period;
transmitting the micro power level having frequencies with a predetermined frequency interval to the wireless power repeater at the predetermined time period;
detecting an internal current value of the wireless power transmitter according to the transmitted micro power;
comparing the internal current value with a threshold value for the each resonance frequency;
determining a first resonance frequency at which the internal current value is not higher than the threshold value, wherein the first resonance frequency corresponds to one of resonance frequencies of the plurality of repeater resonant coils;
changing the power level of the AC power to a power higher than the micro power level;
changing a frequency of the AC power to the first resonance frequency; and
transmitting the AC power to the wireless power repeater using the first resonance frequency.

7. The wireless power transmission method of claim 6, further comprising providing a wireless power receiver, wherein the resonance frequency of the wireless power receiver is set to be equal to the resonance frequency of the wireless power transmitter for the predetermined time period.

8. The wireless power transmission method of claim 6, further comprising:
providing a wireless power receiver; and
transmitting the power to the wireless power receiver through the first repeater resonant coil.

9. The wireless power transmitter of claim 1, wherein each of the repeater resonant coils includes an inductor and a capacitor,
wherein the inductor and the capacitor in each repeater resonant coil have different resonant characteristics.

* * * * *